(12) United States Patent
Wakabayashi et al.

(10) Patent No.: US 11,179,800 B2
(45) Date of Patent: Nov. 23, 2021

(54) LASER PROCESSING DEVICE

(71) Applicant: SHIMADZU CORPORATION, Kyoto (JP)

(72) Inventors: Naoki Wakabayashi, Kyoto (JP); Koji Tojo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 144 days.

(21) Appl. No.: 16/150,294

(22) Filed: Oct. 3, 2018

(65) Prior Publication Data
US 2019/0111515 A1 Apr. 18, 2019

(30) Foreign Application Priority Data
Oct. 16, 2017 (JP) .............................. JP2017-200446

(51) Int. Cl.
*B23K 26/03* (2006.01)
*B23K 26/06* (2014.01)
*B23K 26/082* (2014.01)

(52) U.S. Cl.
CPC ........ *B23K 26/032* (2013.01); *B23K 26/0643* (2013.01); *B23K 26/0648* (2013.01); *B23K 26/082* (2015.10)

(58) Field of Classification Search
CPC .............. B23K 26/0648; B23K 26/082; B23K 26/0643; B23K 26/032
(Continued)

(56) References Cited

U.S. PATENT DOCUMENTS

| 5,589,089 A | * | 12/1996 | Uesugi | B23K 26/702 219/121.6 |
| 8,811,434 B2 | * | 8/2014 | Miyato | H01S 3/0014 372/6 |
| 9,190,802 B2 | * | 11/2015 | Miyato | H01S 3/1608 |
| 2002/0162973 A1 | * | 11/2002 | Cordingley | B23K 26/16 250/492.2 |

(Continued)

FOREIGN PATENT DOCUMENTS

| CN | 101286618 | 10/2008 |
| CN | 204621354 | 9/2015 |

(Continued)

OTHER PUBLICATIONS

Office Action of China Counterpart Application, with English translation thereof, dated Apr. 23, 2020, pp. 1-12.
(Continued)

*Primary Examiner* — Eric S Stapleton
(74) *Attorney, Agent, or Firm* — JCIPRNET

(57) ABSTRACT

Provided is a laser processing device capable of detecting that a return light of a laser light reflected by a processing object is incident on a laser light source. The laser processing device includes: a laser light source which outputs a laser light for processing; a light source for inspection which outputs a laser light for inspection having a wavelength different from that of the laser light for processing; an optical waveguide in which the laser light for processing and the laser light for inspection are incident from an incident surface, and the laser light for processing and the laser light for inspection are emitted from an emission surface toward a processing object; and a detector which detects a return light of the laser light for inspection reflected by the processing object, incident from the emission surface of the optical waveguide and emitted from the incident surface.

6 Claims, 3 Drawing Sheets

(58) Field of Classification Search
USPC .................................................. 219/121.73
See application file for complete search history.

(56) References Cited

U.S. PATENT DOCUMENTS

| | | | | |
|---|---|---|---|---|
| 2004/0012844 | A1* | 1/2004 | Ohtsuki | G03F 7/70058 |
| | | | | 359/341.1 |
| 2004/0188399 | A1* | 9/2004 | Smart | H01L 21/76894 |
| | | | | 219/121.69 |
| 2006/0182383 | A1* | 8/2006 | Slotwinski | G01S 7/4818 |
| | | | | 385/12 |
| 2009/0108173 | A1* | 4/2009 | Kakui | B23K 26/082 |
| | | | | 250/202 |
| 2011/0259858 | A1* | 10/2011 | Wappler | B23K 26/048 |
| | | | | 219/121.64 |
| 2013/0299474 | A1* | 11/2013 | Kashiwagi | H01S 3/2391 |
| | | | | 219/121.81 |
| 2015/0219937 | A1* | 8/2015 | Matsumoto | B23K 26/0622 |
| | | | | 359/279 |

FOREIGN PATENT DOCUMENTS

| | | |
|---|---|---|
| JP | H05277775 | 10/1993 |
| JP | H10335729 | 12/1998 |
| JP | H11211556 | 8/1999 |
| JP | 2012179627 | 9/2012 |
| JP | 2016115829 | 6/2016 |

OTHER PUBLICATIONS

"Office Action of Japan Counterpart Application" with English translation thereof, dated Jul. 27, 2021, p. 1-p. 9.

* cited by examiner

LASER PROCESSING DEVICE

CROSS-REFERENCE TO RELATED APPLICATION

This application claims the priority benefit of Japan application serial no. 2017-200446, filed on Oct. 16, 2017. The entirety of the above-mentioned patent application is hereby incorporated by reference herein and made a part of this specification.

BACKGROUND OF THE DISCLOSURE

Technical Field

The present disclosure relates to a laser processing device which processes a metal material by a laser light.

Related Art

In a laser processing which uses metal materials like stainless, aluminum, copper and the like as processing objects, the laser light reflects on the surface of the processing object. In an optical fiber-coupled laser, there is a possibility that a light reflected by the processing object is recoupled on an emission surface of an optical fiber, propagates in the optical fiber and returns to a laser light source. A fact is know that the light which propagates in the optical fiber and returns (referred to as "return light" hereinafter) causes a failure of the laser light source when the light is incident on the laser light source for outputting the laser light.

Therefore, desirably, whether the return light from the processing object is incident on the laser light source is detected. For example, in patent literature 1 (Japanese Laid-open No. 2012-179627), by a method of arranging a detection unit on a processing head which is arranged close to the processing object, a reflection of the laser light by the processing object is detected.

SUMMARY

Meanwhile, in a method of arranging a detection unit on a processing head close to a processing object, whether a return light propagates an optical path and enters a laser light source cannot be correctly detected. The present disclosure provides a laser processing device capable of detecting that the return light of the laser light reflected by the processing object is incident to the laser light source.

According to one aspect of the present disclosure, a laser processing device is provided, and the laser processing device includes: a laser light source which outputs a laser light for processing; a light source for inspection which outputs a light for inspection having a wavelength different from that of the laser light for processing; an optical waveguide in which the laser light for processing and the laser light for inspection are incident from an incident surface and the laser light for processing and the laser light for inspection are emitted from an emission surface toward a processing object; and a detector which detects a return light of the laser light for inspection reflected by the processing object, incident from the emission surface of the optical waveguide and emitted from the incident surface.

According to the present disclosure, the laser processing device can be provided which is capable of detecting that the return light of the laser light reflected by the processing object is incident on the laser light source.

DESCRIPTION OF THE EMBODIMENTS

With reference to drawings, an embodiment of the present disclosure is described. In the following description of the drawings, identical or similar parts are signed with identical or similar symbols. However, it should be noted that the drawings are schematic. Besides, the following embodiment is an illustration of a device or a method for embodying technical thoughts of the present disclosure, and a structure and an arrangement of components in the embodiment of the present disclosure is not limited to the followings. The embodiment of the present disclosure can be added with various changes in the scope of claims.

Figure 1:
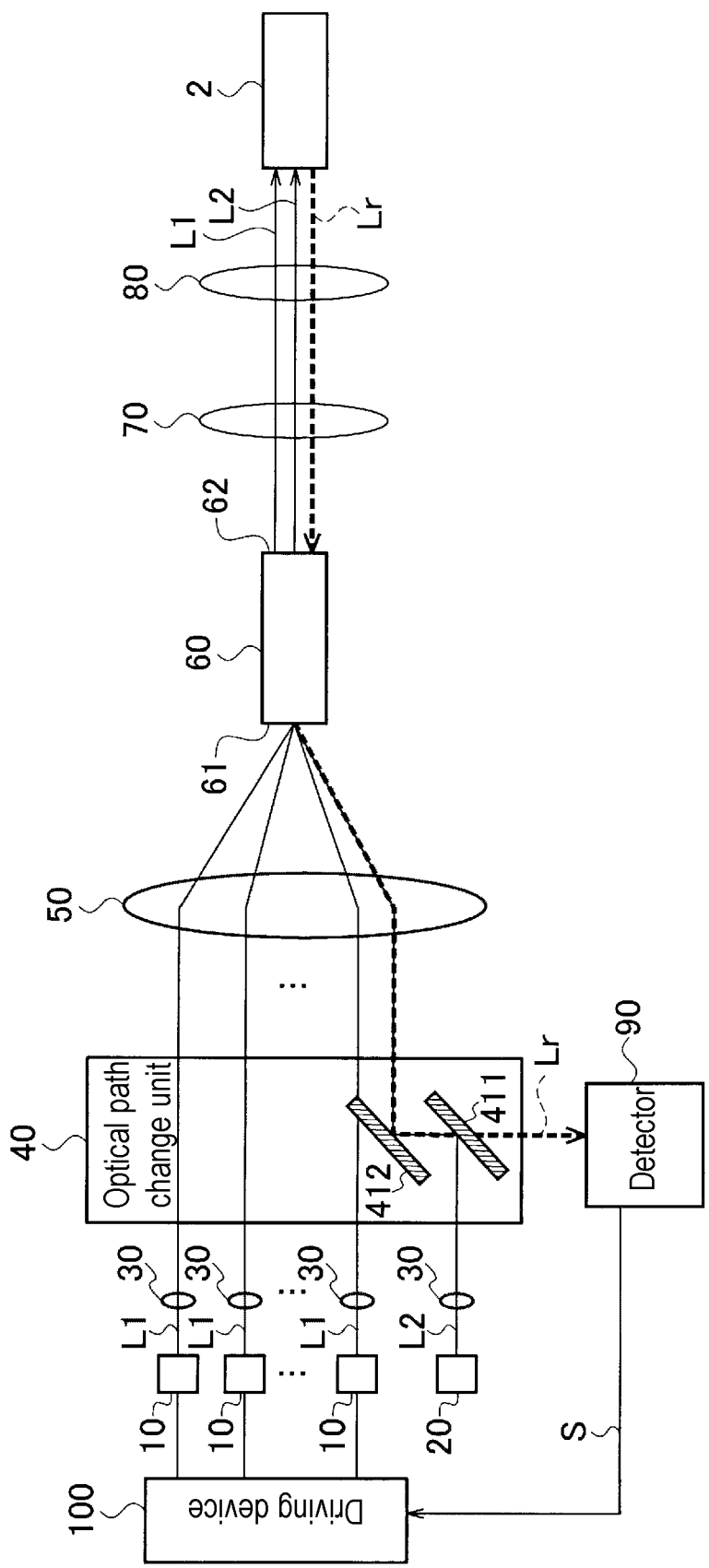
FIG. 1 is a pattern diagram showing a structure of a laser processing device of an embodiment of the present disclosure.

As shown in FIG. 1, a laser processing device of the embodiment of the present disclosure includes: a plurality of laser light sources 10 which output a laser light for processing L1; a light source for inspection 20 which outputs a laser light for inspection L2 having a wavelength different from the laser light for processing L1; an optical waveguide 60 in which the laser light for processing L1 and the laser light for inspection L2 are incident from an incident surface 61, and the laser light for processing L1 and the laser light for inspection L2 are emitted from an emission surface 62 toward a processing object 2; and a detector 90 which detects a return light Lr of the laser light for inspection L2 reflected by the processing object 2, incident from the emission surface 62 of the optical waveguide 60, and emitted from the incident surface 61. The optical waveguide 60 is, for example, an optical fiber.

The laser light source 10 is a semiconductor laser and the like. The laser light source 10 is driven by a driving device 100. For example, a driving current for driving the semiconductor laser is supplied from the driving device 100 to the laser light source 10.

Each laser light for processing L1 right after being output from the laser light source 10 is collimated by an input side collimating lens 30. The input side collimating lens 30 is respectively prepared for the laser light for processing L1.

As shown in FIG. 1, an optical path change unit 40 is arranged between the laser light source 10 and the light source for inspection 20, and a coupled lens 50. The optical path change unit 40 shown in FIG. 1 is configured by a first dichroic mirror 411 and a second dichroic mirror 412. In the following, the first dichroic mirror 411 and the second dichroic mirror 412 are generically called "a dichroic mirror 41". The dichroic mirror 41 is an optical element which transmits the light having a wavelength of the laser light for processing L1, and transmits a part of the light having a wavelength of the laser light for inspection L2 and the return light Lr and reflects a part of the light.

The laser light for processing L1 is transmitted through the dichroic mirror 41, so that even if the dichroic mirror 41 is arranged on a part of the optical path of the laser light for processing L1 as shown in FIG. 1, the optical path of the laser light for processing L1 is not affected by the optical path change unit 40.

Figure 2:
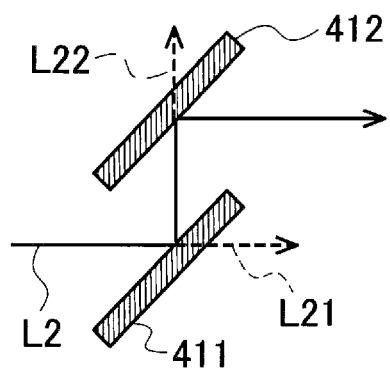
FIG. 2 is a pattern diagram illustrating a function of an optical path change unit of a laser processing device of an embodiment of the present disclosure (1).

After the laser light for inspection L2 is collimated by the input side collimating lens 30 right after being output from the light source for inspection 20, the optical path is changed by the optical path unit 40, and the laser light for inspection L2 is incident on the coupled lens 50. That is, as shown in FIG. 2, a part of the laser light for inspection L2 is reflected by the first dichroic mirror 411, and a part of the laser light for inspection L2 is transmitted through the first dichroic mirror 411. The transmitted light which is transmitted through the first dichroic mirror 411 is shown by L21. A part of the laser light for inspection L2 reflected by the first dichroic mirror 411 is reflected by the second dichroic mirror 412 and is incident on the coupled lens 50. The rest of the laser light for inspection L2 reflected by the first dichroic mirror 411 is transmitted through the second dichroic mirror 412. The transmitted light which is transmitted through the second dichroic mirror 412 is shown by L22.

The collimated laser light for processing L1 and the laser light for inspection L2 which is collimated and of which the optical path is changed by the optical path change unit 40 are incident on the coupled lens 50. Then, by the coupled lens 50, the laser light for processing L1 and the laser light for inspection L2 are coupled to the optical waveguide 60.

The laser light for processing L1 and the laser light for inspection L2 which are incident from the incident surface 61 of the optical waveguide 60 are emitted from the emission surface 62 of the optical waveguide 60, and collimated by an output side collimating lens 70. The collimated laser light for processing L1 is transmitted through a condensing lens 80 and is irradiated to the processing object 2. Accordingly, the laser processing is operated on the processing object 2.

On the other hand, the laser light for inspection L2 collimated by the output side collimating lens 70 is transmitted through the condensing lens 80 and is irradiated to the processing object 2. Besides, the laser light for inspection L2 is a laser light with a low power which does not contribute to the processing of the processing object 2.

When the laser light for processing L1 reflected on the surface of the processing object 2 does not attenuate or scatter in the optical path from the processing object 2 to the laser light source 10, there is a possibility that the laser light for processing L1 returns to the laser light source 10. When the return light is incident on the laser light source 10 which outputs the laser light for processing L1, a failure of the laser light source 10 is caused.

In the laser processing device shown in FIG. 1, by using the detector 90 to detect the return light Lr of the laser light for inspection L2 reflected on the surface of the processing object 2, it is judged that the return light of the laser light for processing L1 is incident on the laser light source 10. That is, when the return light of the laser light for processing L1 is incident on the laser light source 10, the return light Lr of the laser light for inspection L2 is transmitted through the condensing lens 80 and the output side collimating lens 70, and is incident on the emission surface 62 of the optical waveguide 60. Then, the return light Lr emitted from the incident surface 61 of the optical waveguide 60 is transmitted through the coupled lens 50, and is incident on the detector 90 after the optical path is changed by the optical path change unit 40. In FIG. 1, an illustration of the return light of the laser light for processing L1 is omitted.

Figure 3:
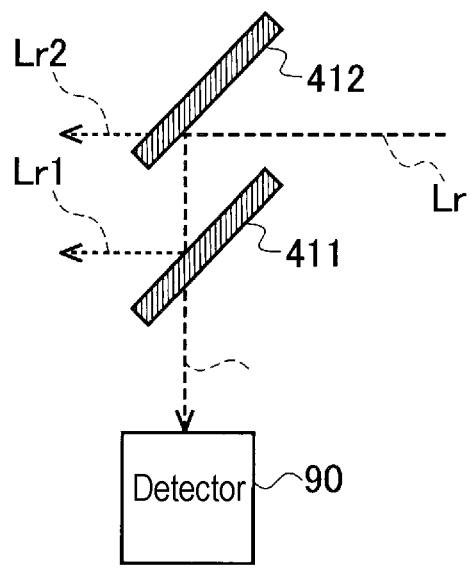
FIG. 3 is a pattern diagram illustrating a function of an optical path change unit of a laser processing device of an embodiment of the present disclosure (2).

In this case, the return light Lr of the laser light for inspection L2 proceeds, as shown in FIG. 3, inside the optical path change unit 40. That is, a part of the return light Lr is reflected by the second dichroic mirror 412, and a part of the return light Lr is transmitted through the second dichroic mirror 412. The transmitted light which is transmitted through the second dichroic mirror 412 is shown by Lr2. A part of the return light Lr reflected by the second dichroic mirror 412 is transmitted through the first dichroic mirror 411 and is incident on the detector 90. The rest of the return light Lr reflected by the second dichroic mirror 412 is reflected by the first dichroic mirror 411. The reflected light which is reflected by the first dichroic mirror 411 is shown by Lr1.

Besides, in the laser processing device shown in FIG. 1, a case is illustrated as an example, in which a pair of dichroic mirrors are used in the optical path change unit 40, but other optical elements capable of changing the optical path of the return light Lr may also be used in the optical path change unit 40. For example, a prism, a beam splitter or the like may be used to constitute the optical path change unit 40.

The detector 90 is equipped with a light receiving element for detecting the incident return light Lr. For example, a photodiode and the like are used as the light receiving element.

When the return light Lr is detected, the detector 90 stops an output of the laser light for processing L1 from the laser light source 10. For example, a control signal is sent to the driving device 100, and a supply of the driving current of the laser light source 10 is stopped. By stopping the output of the laser light for processing L1, the failure of the laser light source 10 caused by the return light can be suppressed.

As shown above, in the laser processing device shown in FIG. 1, the return light Lr which is emitted from the incident surface 61 of the optical waveguide 60 and is transmitted through the coupled lens 50 is detected by the detector 90. Accordingly, whether the return light of the laser light for processing L1 is incident on the laser light source 10 can be judged. That is, when the return light Lr of the laser light for inspection L2 is detected by the detector 90, it is judged that the return light of the laser light for processing L1 is incident on the laser light source 10. On the other hand, when the return light Lr of the laser light for inspection L2 is not detected by the detector 90, it is judged that the return light of the laser light for processing L1 is not incident on the laser light source 10.

In the laser processing device shown in FIG. 1, the return light Lr emitted from the incident surface 61 of the optical waveguide 60 is detected. That is, the return light Lr is detected adjacent to the laser light source 10. Therefore, whether the return light of the laser light for processing L1 is incident on the laser light source 10 can be detected at a high accuracy. In contrast, in a case of the method for detecting the return light around the processing object 2 by arranging a detection unit on the processing head, whether the return light is incident on the laser light source 10 is hard to be correctly detected.

As described above, according to the laser processing device of the embodiment of the present disclosure, whether the return light from the processing object 2 is incident on the laser light source 10 can be correctly judged. Therefore, the failure of the laser light source 10 caused by the incidence of the return light during the output of the laser light for processing L1 can be suppressed. Besides, the laser light for inspection L2 has a low power and can detect the return light Lr in a short time, so that the failure of the light source for inspection 20 caused by the return light Lr can be prevented.

When it is determined that the return light is incident on the laser light source 10, various measures are taken to perform the laser processing of the processing object 2. For example, the measure of shielding or attenuating the return light of the laser light for processing L1, or the measure of changing the optical path of the return light is taken.

Alternative Embodiments

As described above, the present disclosure is described based on the embodiment, but it should not be considered that the present disclosure is restricted by discussions and the drawings constituting a part of the disclosure. From the disclosure, various alternative embodiments, practical examples and application technologies may be understood by the skilled person.

For example, a case is described above in which the measure of stopping the output of the laser light for processing L1 is taken when the return light Lr of the laser light for inspection L2 is detected, but other measures may also be taken. For example, the laser light for processing L1 may be shielded or the optical path may be changed.

Figure 4:
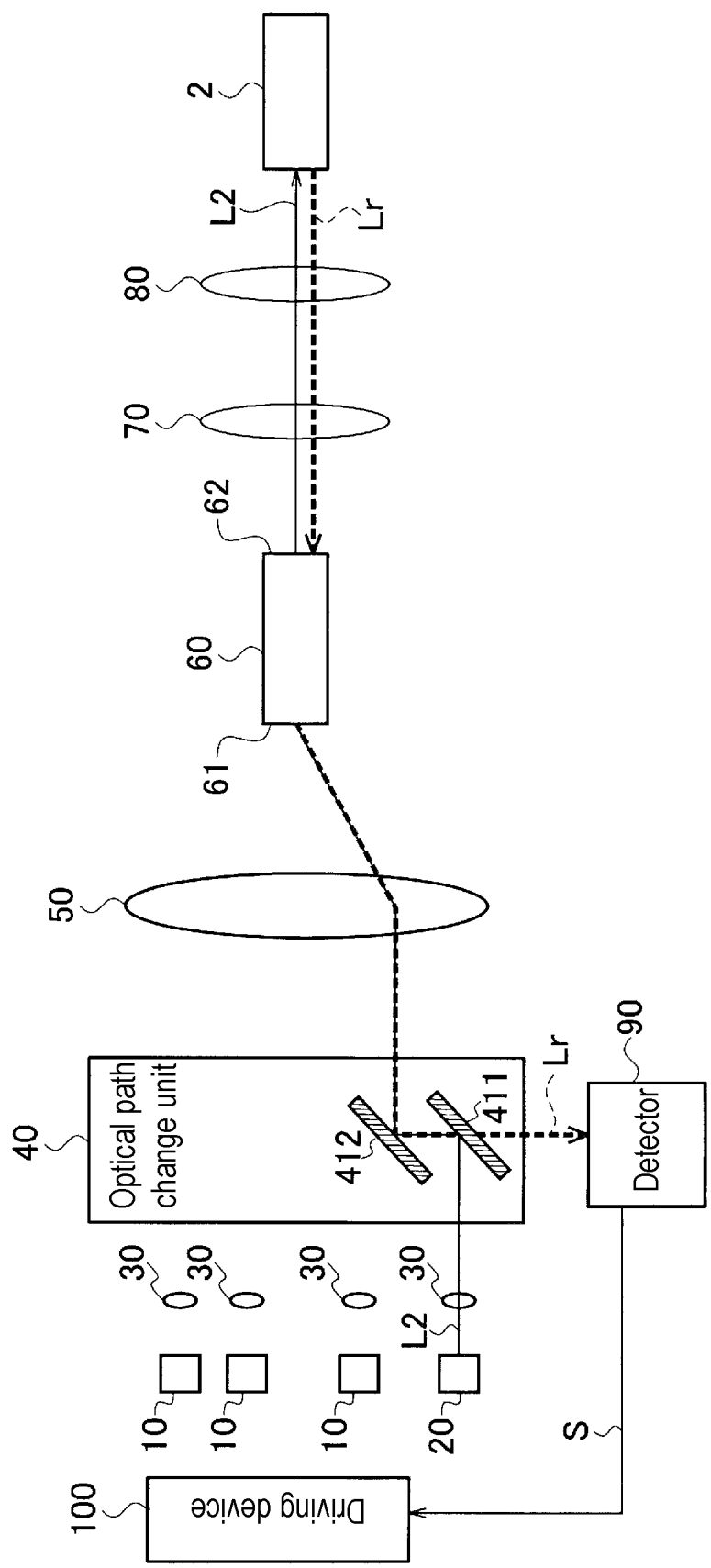
FIG. 4 is a pattern diagram illustrating another example of a detection method of a return light by a laser processing device of an embodiment of the present disclosure.

Besides, in the above description, a case is described in which the laser light for processing L1 and the laser light for inspection L2 are irradiated to the processing object 2 at the same time, and the return light Lr of the laser light for inspection L2 is detected. However, as shown in FIG. 4, it may also be that only the laser light for inspection L2 is irradiated to the processing object 2 before the laser process and the return light Lr is detected. In this case, before the laser light for processing L1 is output from the laser light source 10, it can be detected that the return light of the laser light for processing L1 is incident on the laser light source 10, and the measure can be taken in advance.

Besides, an example is described above, which uses the input side collimating lens 30 for collimating the laser light for processing L1 and the laser light for inspection L2. However, when the laser light collimated from the laser light source 10 or the light source for inspection 20 is output, the arrangement of the input side collimating lens 30 is unnecessary.

As just described, certainly, the present disclosure includes various embodiments which are not described here. Therefore, from the above description, a technical scope of the present disclosure is determined only by disclosure specific matters in the appropriate scope of claims.

What is claimed is:

1. A laser processing device, comprising:
   a laser light source which outputs a laser light for processing;
   a light source for inspection which outputs a laser light for inspection having a wavelength different from that of the laser light for processing;
   an optical waveguide in which the laser light for processing and the laser light for inspection are incident from an incident surface, and the laser light for processing and the laser light for inspection are emitted from an emission surface toward a processing object;
   a detector which detects a return light of the laser light for inspection reflected by the processing object, incident from the emission surface of the optical waveguide and emitted from the incident surface, wherein
   the laser processing device is configured to determine that the return light of the laser light for processing is incident on the laser light source when the return light of the laser light for inspection is detected by the detector, to determine that the return light of the laser light for processing is not incident on the laser light source when the return light of the laser light for inspection is not detected by the detector, and to stop an output of the laser light for processing from the laser light source when the detector detects the return light of the laser light for inspection.

2. The laser processing device according to claim 1, further comprising an optical path change unit which is arranged between the light source for inspection and the incident surface of the optical path, and changes an optical path of the return light, wherein
   the return light emitted from the incident surface of the optical waveguide is changed of the optical path by the optical path change unit and incident on the detector, and
   the optical path change unit comprises a dichroic mirror, a prism or a beam splitter.

3. The laser processing device according to claim 2, wherein the optical path change unit transmits a light having the wavelength of the laser light for processing, and reflects a part of a light having the wavelength of the laser light for inspection and the return light and transmits a part of the light.

4. The laser processing device according to claim 1, further comprising a coupled lens which couples the laser light for processing and the laser light for inspection to the optical waveguide, and
   the detector detects the return light transmitted through the coupled lens.

5. The laser processing device according to claim 1, further comprising a plurality of input side collimating lenses which respectively collimate the laser light for processing right after being output from the laser light source, and the laser light for inspection right after being output from the light source for inspection.

6. The laser processing device according to claim 1, further comprising an output side collimating lens which collimates the laser light for processing and the laser light for inspection emitted from the emission surface of the optical waveguide.

* * * * *